(12) United States Patent
Son et al.

(10) Patent No.: US 11,126,952 B1
(45) Date of Patent: Sep. 21, 2021

(54) ELECTRONIC APPARATUS AND OPERATION METHOD THEREOF

(71) Applicant: Coupang Corp., Seoul (KR)

(72) Inventors: Ho Youn Son, Seoul (KR); Sung Gu Yu, Seoul (KR); Sung Han Kim, Seoul (KR); Ji Ho Chang, Seoul (KR); Sang Beom Kim, Seoul (KR); Han Sham Jeon, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/022,649

(22) Filed: Sep. 16, 2020

(30) Foreign Application Priority Data

Jul. 3, 2020 (KR) .................. 10-2020-0082317

(51) Int. Cl.
*G06Q 10/08* (2012.01)
*H04W 4/029* (2018.01)
*G06Q 50/30* (2012.01)

(52) U.S. Cl.
CPC ......... *G06Q 10/0833* (2013.01); *G06Q 50/30* (2013.01); *H04W 4/029* (2018.02)

(58) Field of Classification Search
CPC .... G06Q 10/0833; G06Q 50/30; H04W 4/029
USPC ........................................................ 705/333
See application file for complete search history.

(56) References Cited

U.S. PATENT DOCUMENTS

| 7,766,230 B2 * | 8/2010 | Skaaksrud | G06Q 10/08 |
| | | | 235/384 |
| 2003/0114206 A1 | 6/2003 | Timothy et al. | |
| 2008/0255758 A1 * | 10/2008 | Graham | G08G 1/20 |
| | | | 701/469 |
| 2015/0199643 A1 * | 7/2015 | Hubner | G06Q 10/0833 |
| | | | 705/333 |
| 2015/0294266 A1 * | 10/2015 | Siragusa | G06Q 10/0833 |
| | | | 705/333 |
| 2017/0265043 A1 | 9/2017 | Lee et al. | |
| 2019/0347612 A1 * | 11/2019 | Anders | G06Q 10/0833 |

FOREIGN PATENT DOCUMENTS

| JP | H 11-201765 A | 7/1999 |
| JP | 2004-018125 A | 1/2004 |
| JP | 2004-035225 A | 2/2004 |
| JP | 2007-261815 A | 10/2007 |
| JP | 4894117 B2 | 3/2012 |
| JP | 5470143 B2 | 4/2014 |
| JP | 2014-132711 A | 7/2014 |
| JP | 6043105 B2 | 12/2016 |
| JP | 2019-006550 A | 1/2019 |

(Continued)

*Primary Examiner* — William Nealon
(74) *Attorney, Agent, or Firm* — Knobbe, Martens, Olson & Bear, LLP

(57) ABSTRACT

An operating method of an electronic apparatus for detecting misdelivery may comprise: monitoring a location of a courier terminal using at least one of first location information, second location information, and third location information; obtaining delivery completion information from the courier terminal; and detecting misdelivery of an item by a courier based on a delivery address and the location of the courier terminal. Accordingly, the electronic apparatus may induce correct delivery to the courier by determining misdelivery of the item based on the location of the courier and the delivery address.

13 Claims, 13 Drawing Sheets

(56) References Cited

FOREIGN PATENT DOCUMENTS

| | | |
|---|---|---|
| KR | 10-1676571 B1 | 11/2016 |
| KR | 10-2018-0031263 A | 3/2018 |
| KR | 10-2019-0035152 A | 4/2019 |
| KR | 10-1955527 B1 | 5/2019 |
| KR | 10-2019-0096739 A | 8/2019 |
| WO | WO 2019/045546 A1 | 3/2019 |

* cited by examiner

ELECTRONIC APPARATUS AND OPERATION METHOD THEREOF

BACKGROUND

Technical Field

The present disclosure relates to an electronic apparatus for detecting misdelivery and an operating method thereof.

Description of the Related Art

Hundreds of thousands of items on average are being delivered every day, and the rate related to misdelivery among them is being managed at a low level. However, regardless of the low rate, customers who experience misdelivery of items may have a negative perception of the company that provides delivery services. Accordingly, companies that provide delivery services are making various attempts, such as reinforcing courier training and marking instructions for delivery in order to reduce misdelivery. However, such an attempt does not provide an efficient solution in relation to the misdelivery because it cannot detect the misdelivery in real time or provide a notification to the courier. Accordingly, there is a need for an accurate and efficient technology capable of inducing correct delivery by detecting the location of the courier in real time and providing an alarm message related to misdelivery.

SUMMARY

Technical Goals

Disclosed embodiments are to disclose an electronic apparatus and an operating method thereof. The technical goals to be solved by the present embodiment are not limited to the technical goals as described above, and other technical goals may be inferred from the following embodiments.

Technical Solutions

According to a first embodiment, an operating method of an electronic apparatus for detecting misdelivery may include: monitoring a location of a courier terminal using at least one of first location information, second location information, and third location information; obtaining delivery completion information from the courier terminal; and detecting misdelivery of an item by a courier based on a delivery address and the location of the courier terminal.

According to a second embodiment, an operating method of a courier terminal for detecting misdelivery may include: transmitting location information of the courier terminal to an electronic apparatus; transmitting delivery completion information to the electronic apparatus upon obtaining the delivery completion information from a courier; outputting an alarm message related to misdelivery when it is determined that an item is misdelivered based on the location information and a delivery address.

According to a third embodiment, an electronic apparatus for detecting misdelivery may include: a communication device receiving delivery completion information from a courier terminal; and a controller configured to monitor a location of the courier terminal using at least one of first location information, second location information, and third location information and detect misdelivery of an item by a courier based on a delivery address and the location of the courier terminal.

According to a fourth embodiment, a computer-readable recording medium includes a non-transitory recording medium on which a program for executing the above-described method on a computer is recorded.

Details of other embodiments are included in the detailed description and drawings.

Effects

According to the present disclosure, the electronic apparatus may monitor the location of the courier terminal and detect misdelivery of an item by the courier based on the delivery address and the location of the courier terminal at the moment delivery completion information is obtained. Accordingly, misdelivery is detected in real time, and correct delivery is induced through an alarm message, so that delivery services can be managed more accurately and efficiently.

The advantageous effects of the invention are not limited to the effects mentioned above, and other effects which are not mentioned will become apparent to those skilled in the art from the description of the claims.

DETAILED DESCRIPTION

The terms used in the embodiments have selected general terms that are currently widely used as possible while taking functions in the present disclosure into consideration, but this may vary according to the intention or precedent of a technician operating in the art, the emergence of new technologies, and the like. In addition, in certain cases, there are terms arbitrarily selected by the applicant, and in this case, the meaning will be described in detail in the corresponding description. Therefore, the terms used in the present disclosure should be defined based on the meaning of the term and the contents of the present disclosure, not the name of a simple term.

When a part of the specification is said to "include" a certain element, it means that other elements may be further included instead of excluding other elements unless otherwise stated. In addition, terms such as "~ unit" and "~ module" described in the specification mean units that process at least one function or operation, which may be implemented as hardware or software, or as a combination of hardware and software.

The expression of "at least one of a, b, and c" described throughout the specification is "a alone", "b alone", "c alone", "a and b", "a and c", "b and c", or "a, b, c all" may be included.

The "terminal" mentioned below may be implemented as a computer or portable terminal that can access a server or other terminal through a network. Here, the computer includes, for example, a notebook equipped with a web browser, a desktop, a laptop, and the like, and the portable terminal may include a handheld-based wireless communication device, for example, a wireless communication device that guarantees portability and mobility, International Mobile Telecommunication (IMT), Code Division Multiple Access (CDMA), W-Code Division Multiple Access (W-CDMA), and all kinds of communication-based terminals such as LTE (Long Term Evolution), smartphones, tablet PCs, etc.

Hereinafter, exemplary embodiments of the present disclosure will be described in detail with reference to the accompanying drawings so that those of ordinary skill in the art may easily implement the present disclosure. However, the present disclosure may be implemented in various different forms and is not limited to the exemplary embodiments described herein.

Hereinafter, exemplary embodiments of the present disclosure will be described in detail with reference to the drawings.

Figure 1:
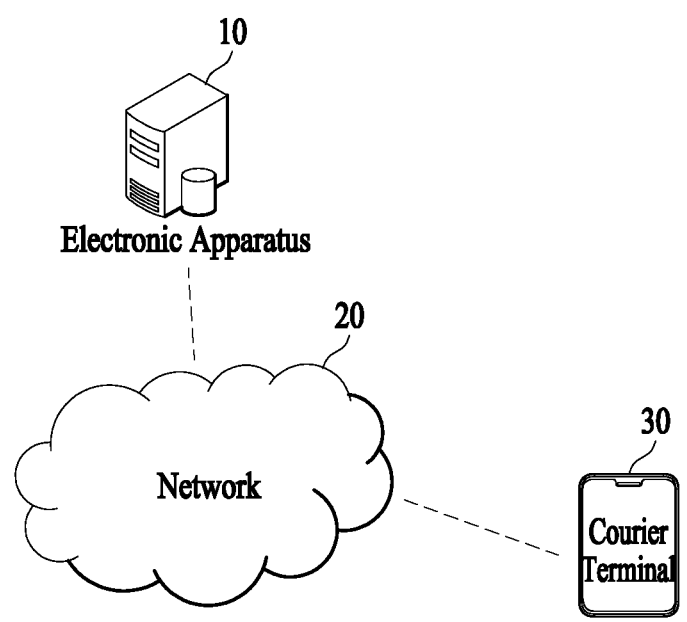
FIG. 1 illustrates a delivery system according to an embodiment.

FIG. 1 illustrates a delivery system according to an embodiment.

Referring to FIG. 1, the delivery system may include an electronic apparatus 10 and a courier terminal 30, and a network 20. In the delivery system shown in FIG. 1, only the components related to this embodiment are shown. Therefore, it can be understood by those of ordinary skill in the art related to this embodiment that components other than those illustrated in FIG. 1 may be further included.

The electronic apparatus 10 and the courier terminal 30 may communicate with each other within the network 20. The network 20 includes a local area network (LAN), a wide area network (WAN), a value added network (VAN), a mobile radio communication network, a satellite communication network, and combinations thereof, and the network is a comprehensive data communication network that allows each network component shown in FIG. 1 to communicate smoothly with each other and may include wired Internet, wireless Internet, and mobile wireless communication networks. Wireless communication is, for example, wireless LAN (Wi-Fi), Bluetooth, Bluetooth low energy, Zigbee, WFD (Wi-Fi Direct), UWB (ultra-wideband), infrared communication (IrDA, infrared data association), NFC (Near Field Communication), and the like, but are not limited thereto.

The electronic apparatus 10 may provide a platform for an item delivery service. The electronic apparatus 10 may provide an application for providing the item delivery service to the courier terminal 30. In this case, the electronic apparatus 10 may be included in a server that provides the item delivery service. Specifically, the electronic apparatus 10 may allocate delivery of items to the courier terminal 30 of a courier selected from among a plurality of couriers in response to a delivery request of the items. At this time, the electronic apparatus 10 may provide information related to the item to the courier terminal 30 of the selected courier. Here, the information related to the item is information necessary for delivery of the item, and may include, for example, an invoice number and purchaser information. Here, the invoice number may be a unique number including information related to overall matters related to the transport of the item, and the purchaser information may include personal information of the purchaser such as a purchaser name, a phone number, and a delivery address.

The courier may be allocated delivery of the items from the electronic apparatus 10 using the courier terminal 30. Each courier has at least one unique courier terminal 30, and the courier terminal 30 may transmit information related to the delivery progress status to the electronic apparatus 10, whereby the related information can be updated. The electronic apparatus 10 may obtain the information related to delivery using an application installed in the courier terminal 30. For example, delivery completion information may be input to the courier terminal 30 by the courier, and the courier terminal 30 may transmit related information to the electronic apparatus 10 using the network 20. For another example, the electronic apparatus 10 may monitor location information of the courier terminal 30 through the application installed on the courier terminal 30.

The electronic apparatus 10 may monitor the location of the courier terminal 30 and may detect misdelivery of the item by the courier based on the delivery address and the location of the courier terminal at the moment delivery completion information is obtained from the courier terminal. Hereinafter, a detailed process for detecting misdelivery by the electronic apparatus 10 and the courier terminal 30 will be described.

Figure 2:
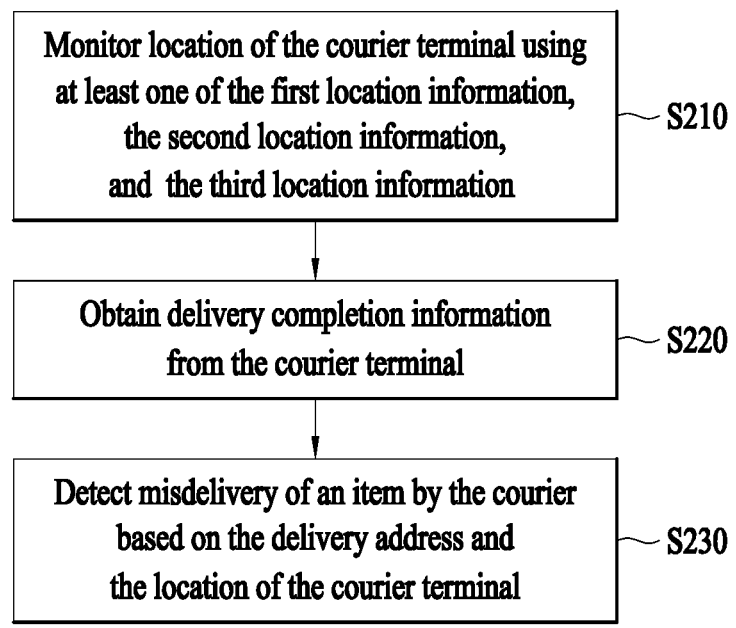
FIG. 2 illustrates an embodiment of an operating method of an electronic apparatus.

FIG. 2 illustrates an embodiment of an operating method of an electronic apparatus.

In operation S210, the electronic apparatus may monitor the location of the courier terminal using at least one of the first location information, the second location information, and the third location information. The electronic apparatus may obtain the location information of the courier terminal using an application installed on the courier terminal. At this time, the first location information may include location information of the courier terminal determined based on communication with the satellite, and the second location information includes location information of the courier terminal determined based on communication with the base station. In addition, the third location information may include location information of the courier terminal corrected based on at least one of the first location information and the second location information. For example, the first location information may include GPS location information of the courier terminal determined based on communication between the courier terminal and the satellite, and the second location information may include network GPS location information of the courier terminal determined based on communication between the courier terminal and the base station. Also, the third location information may include location information in which the first location information is corrected based on the second location information or other information. At this time, the first location information, the second location information, and the third location information may include time information as well as coordinate information indicating the location of the courier terminal.

The electronic apparatus may repeatedly obtain the location information of the courier terminal using the application installed on the courier terminal. For example, the electronic apparatus may obtain the location information of the courier terminal at 3 second intervals based on the first location information, obtain the location information of the courier terminal at 3 second intervals based on the second location information, or obtain the location information of the courier terminal at 3 second intervals based on the third location information.

In operation S220, the electronic apparatus may obtain delivery completion information from the courier terminal. When the courier delivered the item to the delivery address, the courier may select a delivery completion button on the courier terminal, and the electronic apparatus can obtain delivery completion information through the application.

The electronic apparatus may connect the location information of the monitored courier terminal at the moment when delivery completion information is obtained. Specifically, the electronic apparatus may connect the location information of the courier terminal monitored for a specific time before obtaining the delivery completion information at the moment when the delivery completion information is obtained. For example, the electronic apparatus may connect 60 pieces of location information of the courier terminal monitored for 3 minutes before obtaining the delivery completion information. More specifically, the electronic apparatus may connect 60 pieces of location information of the courier terminal monitored for 3 minutes based on the first location information. Also, the electronic apparatus may connect 60 pieces of location information of the courier terminal monitored for 3 minutes based on the second location information. The electronic apparatus may connect 60 pieces of location information of the courier terminal monitored for 3 minutes based on the third location information.

In operation S230, the electronic apparatus may detect misdelivery of an item by the courier based on the delivery address and the location of the courier terminal.

When the first location information includes the monitored location information within a reference time (e.g., 10 minutes) from the moment when the delivery completion information is obtained, the electronic apparatus may detect misdelivery. If the first location information includes monitored location information other than the reference time from the moment when the delivery completion information is obtained, the electronic apparatus may output that it cannot determine misdelivery. For example, assume that the delivery completion information is obtained at 10:00, when the first location information includes the location information monitored at 10:12, the electronic apparatus may output that it cannot determine misdelivery, or when the first location information includes location information monitored at 10:04, the electronic apparatus may detect misdelivery. That is, when the reference time has elapsed from the moment when the delivery completion information is obtained, the electronic apparatus may output that it cannot determine misdelivery in consideration of reliability and accuracy. In addition, when the number of pieces of the first location information, the second location information, and the third location information corresponds to a reference number (e.g., 20) or more, the electronic apparatus may detect misdelivery. For example, when the number of pieces of the monitored first location information, second location information, and third location information is 18, the electronic apparatus may output that it cannot determine misdelivery. This is because if the number of pieces of the monitored location information is smaller than the reference number, the accuracy of the location information may be low. In addition, when each location of the courier terminal corresponding to the first location information, the second location information, and the third location information corresponds to within a reference distance (e.g., 75 m), the electronic apparatus may detect misdelivery. For example, when each location of the courier terminal corresponding to the first location information, the second location information, and the third location information is separated by 90 m, the electronic apparatus may output that it cannot determine misdelivery. This is because if the monitored location is spaced apart more than the reference distance, the reliability of the location information may be low. In this way, the electronic apparatus may output that it is impossible to determine misdelivery when a certain requirement is not satisfied, or may output a determination result of misdelivery if a certain requirement is satisfied. Here, the reference time, the reference number, and the reference distance may be values previously optimized through an experiment.

The delivery address is an address determined based on the address input by the purchaser, and a shape of the delivery address may be displayed on a map as shown in FIGS. 4 to 10 below. In this case, the shape of the delivery address may include an area of a building in which the delivery address is located or an area within a predetermined distance based on the delivery address. For example, the area of a building may include information about the exterior of the building, and the shape of the delivery address may include information about the exterior of the building where the delivery address is located. For another example, the shape of the delivery address may include an area within a radius of 1 m based on the delivery address. The shape of the delivery address as shown in FIGS. 4 to 10 is only an example, and a shape corresponding to the actual shape of the delivery address may be displayed on a map.

The electronic apparatus may monitor the location of the courier terminal as described above. The electronic apparatus may detect misdelivery of an item by the courier based on whether the monitored location information of the courier terminal matches the delivery address.

According to an embodiment, the electronic apparatus may extract a first line based on the first location information. In addition, the electronic apparatus may extract a second line based on the second location information and the third location information. A detailed process of extracting the first line and the second line will be described in detail in FIG. 4 below. The electronic apparatus may detect misdelivery of an item based on whether at least one of the first line and the second line matches the delivery address on the map. At this time, if at least one of the first line and the second line matches the delivery address on the map, the electronic apparatus may determine that the item has been delivered to the delivery address, or if both the first line and the second line match an address other than the delivery address on the map, the electronic apparatus may determine misdelivery in which the item is incorrectly delivered to an address other than the delivery address. Alternatively, the electronic apparatus may determine that the location of the courier terminal is unreliable based on the first line and the second line. A detailed description of this will be provided in FIGS. 8 to 10 below.

According to an embodiment, the electronic apparatus may extract a first polygon when each location of the courier terminal corresponding to the first location information, the second location information, and the third location information corresponds to a specific condition. A detailed process of extracting the first polygon will be described in detail in FIG. 5 below. The electronic apparatus may detect misdelivery of an item based on whether the first polygon matches the delivery address on the map. At this time, if the first polygon matches the delivery address on the map, the electronic apparatus may determine that the item has been delivered to the delivery address, and if the first polygon matches an address other than the delivery address on the map, the electronic apparatus may determine misdelivery in which the item is incorrectly delivered to an address other than the delivery address. Alternatively, the electronic apparatus may determine that the location of the courier terminal is unreliable based on the first polygon. A detailed description of this will be provided in FIGS. 8 to 10 below.

According to an embodiment, the electronic apparatus may monitor whether a signal related to at least one of the first location information, the second location information, and the third location information changes by more than a reference value. For example, when the courier enters the interior of a building, the strength of a signal transmitted and received between the courier terminal and a satellite or the number of signals therebetween may change. At this time, when the signal strength or the number of signals changes by more than a reference value, the electronic apparatus may determine that the courier has entered the interior. When a signal related to at least one of the first location information, the second location information, and the third location information changes by more than a reference value, the electronic apparatus may determine that the courier has entered the interior. Accordingly, the electronic apparatus may extract the third line based on the first location information before it changes by more than a reference value, and may also extract the fourth line based on the second location information and the third location information before they change by more than a reference value. A detailed process of extracting the third line and the fourth line will be described in detail in FIG. 6 below. The electronic apparatus may detect misdelivery of an item based on whether at least one of the third line and the fourth line matches the delivery address on the map. At this time, if at least one of the third line and the fourth line matches the shape of a delivery address on the map, the electronic apparatus may determine that the item has been delivered to the delivery address, or if both the third line and the fourth line match an address other than the delivery address on the map, the electronic apparatus may determine misdelivery in which the item is incorrectly delivered to an address other than the delivery address. Alternatively, the electronic apparatus may determine that the location of the courier terminal is unreliable based on the third line and the fourth line. A detailed description of this will be provided in FIGS. 8 to 10 below.

According to an embodiment, the electronic apparatus may monitor whether a signal related to at least one of the first location information, the second location information, and the third location information changes by more than a reference value. For example, when the courier enters the interior of a building, the strength of a signal transmitted and received between the courier terminal and a satellite or the number of signals therebetween may change. At this time, when the signal strength or the number of signals changes by more than a reference value, the electronic apparatus may determine that the courier has entered the interior. When a signal related to at least one of the first location information, the second location information, and the third location information changes by more than a reference value, the electronic apparatus may extract a second polygon when each location of the courier terminal corresponding to the first location information, the second location information, and the third location information before they change by more than a reference value corresponds to a specific condition. A detailed process of extracting the second polygon will be described in detail in FIG. 7 below. The electronic apparatus may detect misdelivery of an item based on whether the second polygon matches the delivery address on the map. At this time, if the second polygon matches the delivery address on the map, the electronic apparatus may determine that the item has been delivered to the delivery address, and if the second polygon matches an address other than the delivery address on the map, the electronic apparatus may determine misdelivery in which the item is incorrectly delivered to an address other than the delivery address. Alternatively, the electronic apparatus may determine that the location of the courier terminal is unreliable based on the second polygon. A detailed description of this will be provided in FIGS. 8 to 10 below.

According to an embodiment, the electronic apparatus may detect misdelivery of an item based on whether at least one of the first line, the second line, the third line, the fourth line, the first polygon, and the second polygon matches the delivery address. If at least one of the first line, the second line, the third line, the fourth line, the first polygon, and the second polygon matches the delivery address, the electronic apparatus may determine that the item has been delivered to the delivery address. If all of the first line, the second line, the third line, the fourth line, the first polygon, and the second polygon match an address other than the delivery address on the map, the electronic apparatus may determine misdelivery in which the item is incorrectly delivered to an address other than the delivery address. Alternatively, the electronic apparatus may determine that the location of the courier terminal is unreliable based on the first line, the second line, the third line, the fourth line, the first polygon, and the second polygon. When the misdelivery is detected based on whether at least one of the first line, the second line, the third line, the fourth line, the first polygon, and the second polygon matches the delivery address, the reliability and accuracy of misdelivery detected by the electronic apparatus may be further improved. For example, when the misdelivery is detected based on whether at least one of the first line, the second line, the third line, the fourth line, the first polygon, and the second polygon matches the delivery address, the reliability and accuracy of misdelivery detected by the electronic apparatus may be further improved than when the misdelivery is detected based on whether at least one of the first line, the second line, and the first polygon matches the delivery address. A detailed description of this will be provided in FIGS. 8 to 10 below.

The electronic apparatus may transmit an alarm message to the courier terminal when misdelivery is determined. At this time, the alarm message may include at least one of past delivery completion information, current delivery completion information, and information related to delivery of the item. Information included in the alarm message will be described in detail in FIG. 11 below.

The electronic apparatus may monitor the location of the courier in real time, accurately detect misdelivery based on whether at least one of the first line, the second line, the third line, the fourth line, the first polygon, and the second polygon matches the delivery address in consideration of the error of the location information of the courier terminal, and provide an alarm message to the courier. Accordingly, the courier may perform correct delivery according to the alarm message, thereby providing an accurate delivery service to the customer.

Figure 3:
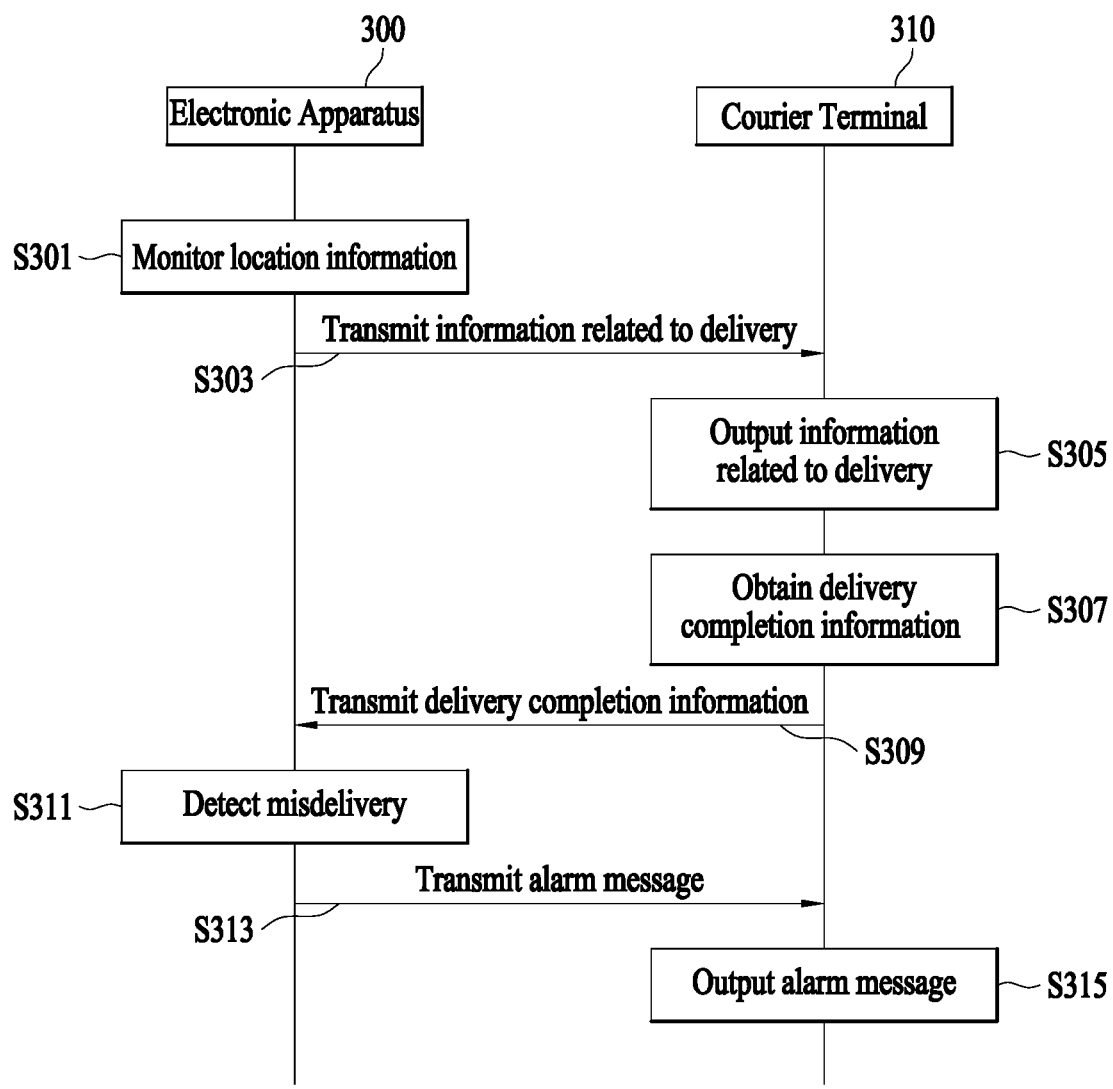
FIG. 3 illustrates an embodiment of an operation of an electronic apparatus and a courier terminal.

FIG. 3 illustrates an embodiment of an operation of an electronic apparatus and a courier terminal. An application may be installed on the courier terminal 310, and the courier terminal 310 and the electronic apparatus 300 may transmit and receive related data through the application.

In operation S301, the electronic apparatus 300 may monitor location information of the courier terminal 310. At this time, the electronic apparatus 300 may repeatedly monitor the location information of the courier using at least one of the first location information, the second location information, and the third location information. For example, the electronic apparatus 300 may monitor the first location information of the courier based on the communication between the satellite and the courier terminal such as position X1 at 10:00:03, position X2 at 10:00:06, position X3 at 10:00:09, and so on. For another example, the electronic apparatus 300 may monitor the second location information of the courier based on the communication between the base station and the courier terminal such as position Y1 at 10:00:03, position Y2 at 10:00:06, position Y3 at 10:00:09, and so on. For another example, the electronic apparatus 300 may monitor the third location information of the courier such as position Z1 at 10:00:03, position Z2 at 10:00:06, position Z3 at 10:00:09, and so on corrected based on the first location information. Here, X1, Y1, and Z1 are location information indicating the location of the courier terminal at 10:00:03, X2, Y2 and Z2 are location information indicating the location of the courier terminal at 10:00:06, and X3, Y3, and Z3 are location information indicating the location of the courier terminal at 10:00:09. At this time, X1, Y1, and Z1 are information indicating the location of the courier terminal at the same time, but may include different coordinates due to an error.

In operation S303, the electronic apparatus 300 may transmit information related to delivery to the courier terminal 310. The electronic apparatus 300 may select a courier to deliver an item in consideration of the location information of the courier terminal 310 and transmit information related to delivery to the selected courier. At this time, the information related to delivery may include an invoice number and purchaser information.

In operation S305, the courier terminal 310 may output the information related to delivery received through the application on the display. The courier may deliver the item to the delivery address using the courier terminal 310.

In operation S307, when the delivery of the item is completed, the courier terminal 310 may receive delivery completion information from the courier. In operation S309, the courier terminal 310 may transmit the delivery completion information to the electronic apparatus 300 using the application.

In operation S311, the electronic apparatus 300 may detect misdelivery at the moment when the delivery completion information is received. At this time, the electronic apparatus 300 may output whether it is impossible to determine misdelivery based on the first location information, the second location information, and the third location information when the delivery completion information is received. Specifically, when the first location information includes location information monitored after a reference time elapses from the moment when the delivery completion information is obtained, the electronic apparatus may output that it cannot determine misdelivery. Or, when the number of pieces of the first location information, the second location information, and the third location information obtained during a specific time in the past (e.g., 3 minutes) from the moment when delivery completion information is obtained is less than the reference number (e.g., 20 pieces), the electronic apparatus may output that it cannot determine misdelivery. Alternatively, if each location of the courier terminal corresponding to the first location information, the second location information, and the third location information is separated by more than a reference distance (e.g., 75 m) at the time when the delivery completion information is obtained, the electronic apparatus may output that it cannot determine misdelivery.

When the electronic apparatus 300 can determine misdelivery, the electronic apparatus may detect misdelivery based on whether the location of the courier terminal determined based on the first location information, the second location information, and the third location information matches the delivery address.

In operation S313, upon detecting misdelivery, the electronic apparatus 300 may transmit an alarm message to the courier terminal 310. When the electronic apparatus 300 detects normal delivery, it may not transmit the alarm message to the courier terminal 310. In operation S315, the courier terminal 310 may output the alarm message through the display.

At this time, the alarm message may include at least one of past delivery completion information, current delivery completion information, and information related to delivery of the item. For example, the alarm message may include at least one of a picture of past delivery completion, a picture of current delivery completion, and a delivery address. The courier receiving the alarm message can check whether the delivery is incorrect, and in case of misdelivery, correct delivery can be made.

According to an embodiment, the electronic apparatus may monitor real-time location information of the courier terminal to detect misdelivery at the moment delivery is completed. At this time, the electronic apparatus may provide accurate information to the courier by detecting misdelivery in consideration of an error in real-time location information.

Figure 4:
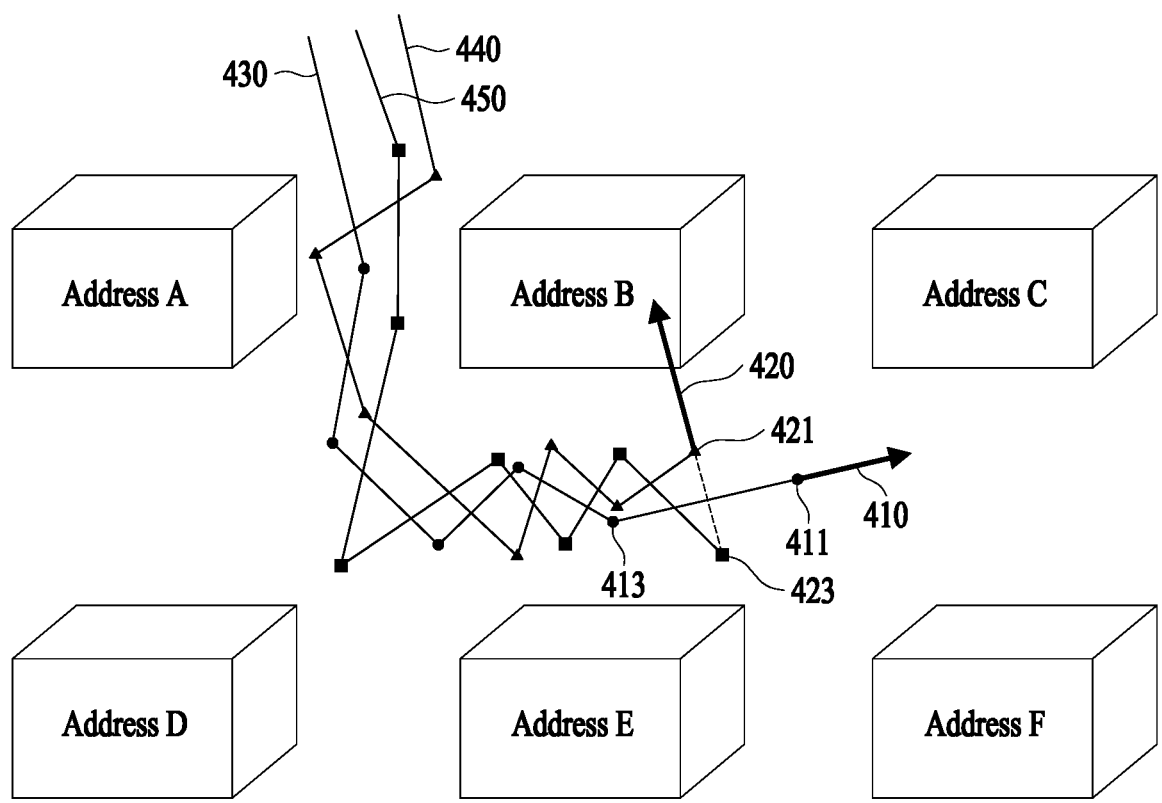
FIG. 4 illustrates an embodiment of extracting a first line and a second line using location information.

FIG. 4 illustrates an embodiment of extracting a first line and a second line using location information.

The courier may select a delivery completion button on the courier terminal, and the electronic apparatus may identify and connect the location information of the courier terminal for a specific time (e.g., 3 minutes) in the past from the moment when delivery completion information is obtained.

Specifically, the electronic apparatus may identify and connect the first location information 430 of the courier terminal for a specific time in the past from the moment when delivery completion information is obtained. At this time, the first location information 430 may include location information of the courier terminal determined based on communication between the courier terminal and the satellite. For example, the first location information 430 may include location information of the courier terminal obtained at 3 second intervals.

Also, the electronic apparatus may identify and connect the second location information 440 of the courier terminal for a specific time in the past from the moment when delivery completion information is obtained. The second location information 440 may include location information of the courier terminal determined based on communication between the courier terminal and the base station. For example, the second location information 440 may include location information of the courier terminal obtained at 3 second intervals.

In addition, the electronic apparatus may identify and connect the third location information 450 of the courier terminal for a specific time in the past from the moment when delivery completion information is obtained. The third location information 450 may include location information of the courier terminal corrected based on at least one of the first location information and the second location information. For example, the third location information 450 may include location information of the courier terminal in which the first location information obtained at 3 second intervals is corrected.

The location information 411 may be information related to the location of the courier terminal that is last identified based on the first location information 430 when the electronic apparatus obtains delivery completion information. The location information 413 may be information related to the location of the courier terminal identified before the location information 411. For example, when the electronic apparatus obtains the delivery completion information at 10:10:08, the location information 411 may be information related to the location of the courier terminal identified at 10:10:06, and the location information 413 may be information related to the location of the courier terminal identified at 10:10:03.

The location information 421 may be information related to the location of the courier terminal that is last identified based on the second location information 440 when the electronic apparatus obtains the delivery completion information. For example, when the electronic apparatus obtains delivery completion information at 10:10:08, the location information 421 may be information related to the location of the courier terminal that the electronic apparatus identified at 10:10:06 based on the second location information 440.

The location information 423 may be information related to the location of the courier terminal that is last identified based on the third location information 450 when the electronic apparatus obtains the delivery completion information. For example, when the electronic apparatus obtains delivery completion information at 10:10:08, the location information 423 may be information related to the location of the courier terminal that the electronic apparatus identified at 10:10:06 based on the third location information 450.

At this time, the first line 410 may be an extension line extending from the location information 413 toward the location information 411 by a predetermined length (e.g., 6 m). In addition, the second line 420 may be an extension line extending from the location information 423 toward the location information 421 by a predetermined length (e.g., 6 m). In this case, the extended length is optimized through an experiment, and may be varied according to the delivery environment. For example, for the delivery address in the city center that is an environment in which buildings are concentrated and for the delivery address in an environment in which buildings are not concentrated unlike the city center, the predetermined length may be set differently.

If the delivery address of the item on the map is address B, since at least one of the first line 410 and the second line 420 matches the address B, the electronic apparatus may determine that the courier correctly delivered the item to the delivery address. Or, if the delivery address of the item on the map is address A other than the address B, neither the first line 410 nor the second line 420 matches the address A. Accordingly, the electronic apparatus may determine that the courier misdelivered the item.

Figure 5:
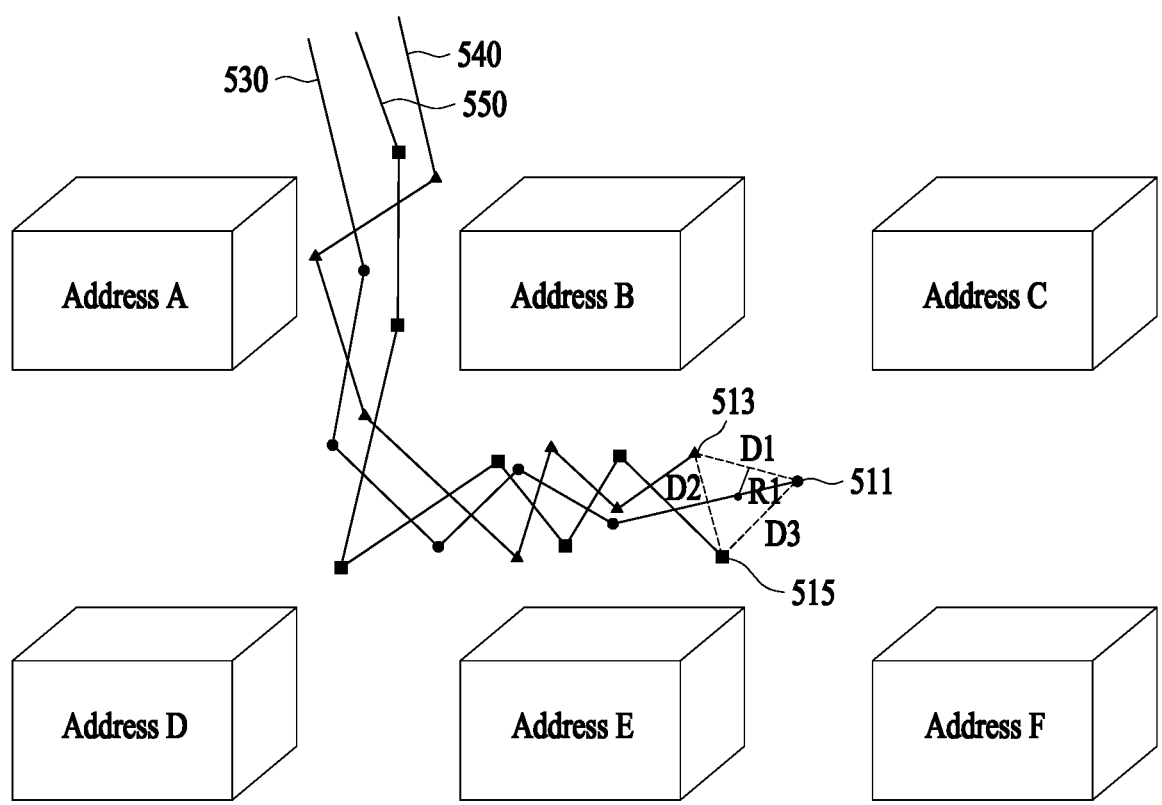
FIG. 5 illustrates an embodiment of extracting a first polygon using location information.

According to an embodiment, since it is determined whether or not the courier has reached the delivery address using different location information, the accuracy in which the electronic apparatus detects misdelivery of an item may be improved. FIG. 5 illustrates an embodiment of extracting a first polygon using location information.

The courier may select the delivery completion button on the courier terminal, and the electronic apparatus may identify and connect the location information of the courier terminal for a specific time (e.g., 3 minutes) in the past from the moment when delivery completion information is obtained.

Specifically, the electronic apparatus may identify and connect the first location information 530 of the courier terminal for a specific time in the past from the moment when delivery completion information is obtained. At this time, the first location information 530 may include location information of the courier terminal determined based on communication between the courier terminal and the satellite. For example, the first location information 530 may include location information of the courier terminal obtained at 3 second intervals.

Also, the electronic apparatus may identify and connect the second location information 540 of the courier terminal for a specific time in the past from the moment when delivery completion information is obtained. The second location information 540 may include location information of the courier terminal determined based on communication between the courier terminal and the base station. For example, the second location information 540 may include location information of the courier terminal obtained at 3 second intervals.

In addition, the electronic apparatus may identify and connect the third location information 550 of the courier terminal for a specific time in the past from the moment when delivery completion information is obtained. The third location information 550 may include location information of the courier terminal corrected based on at least one of the first location information and the second location information. For example, the third location information 550 may include location information of the courier terminal in which the first location information obtained at 3 second intervals is corrected.

At this time, the location information 511 may be information related to the location of the courier terminal that is last identified based on the first location information 530 when the electronic apparatus obtains delivery completion information. Also, the location information 513 may be information related to the location of the courier terminal that is last identified based on the second location information 540 when the electronic apparatus obtains delivery completion information. In addition, the location information 515 may be information related to the location of the courier terminal that is last identified based on the third location information 550 when the electronic apparatus obtains delivery completion information. For example, when the electronic apparatus obtains delivery completion information at 10:10:08, the location information 511 may be information related to the location of the courier terminal identified at 10:10:06 based on the first location information 530, the location information 513 may be information related to the location of the courier terminal identified at 10:10:06 based on the second location information 540, and the location information 515 may be information related to the location of the courier terminal identified at 10:10:06 based on the third location information 550.

Here, the first polygon may be extracted when the location information 511, the location information 513, and the location information 515 correspond to a specific condition. Specifically, when i) the separation distances D1, D2, and D3 between the location information 511, the location information 513, and the location information 515 are less than a predetermined distance (e.g., 15 m), and ii) the midpoint 1 between the location information 511 and the location information 513, the midpoint 2 between the location information 513 and the location information 515, and the midpoint 3 between the location information 515 and the location information 511 are included in the inside of a circle with radius R1 (e.g., 4 m), the first polygon may be extracted. At this time, the predetermined distance and radius R1 are values optimized through an experiment and may vary according to the delivery environment.

For example, the separation distance D1 between the location information 511 and the location information 513 may be less than 15 m, the separation distance D2 between the location information 513 and the location information 515 may be less than 15 m, and the separation distance D3 between the location information 515 and the location information 511 may be less than 15 m. In addition, when the midpoint 1 between the location information 511 and the location information 513, the midpoint 2 between the location information 513 and the location information 515, and the midpoint 3 between the location information 515 and the location information 511 are included inside a circle with a radius R1 (e.g., 4 m), the first polygon may be extracted.

When the first polygon matches the delivery address, the electronic apparatus may determine that the courier accurately delivered the item to the delivery address. However, if the first polygon does not match the delivery address, the electronic apparatus may determine that the courier misdelivered the item.

Figure 6:
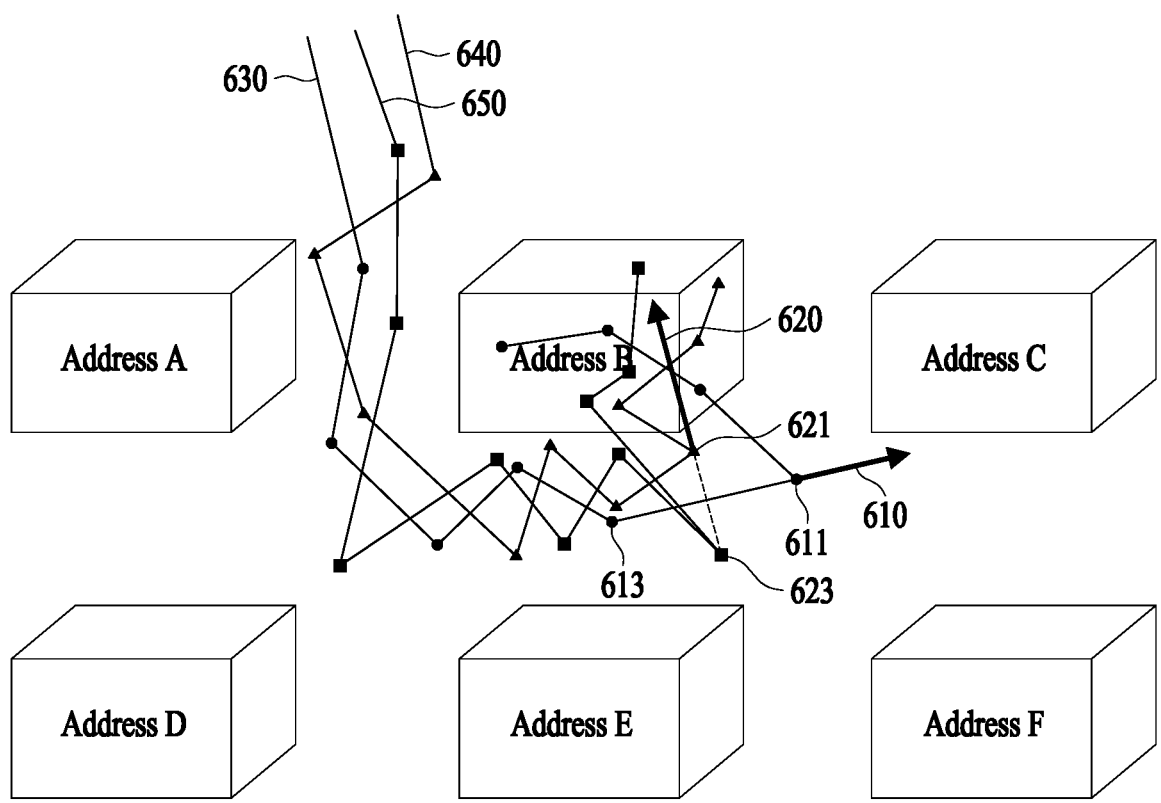
FIG. 6 illustrates an embodiment of extracting a third line and a fourth line using location information.

FIG. 6 illustrates an embodiment of extracting a third line and a fourth line using location information.

The courier may select the delivery completion button on the courier terminal, and the electronic apparatus may identify and connect the location information of the courier terminal for a specific time (e.g., 3 minutes) in the past from the moment when delivery completion information is obtained. For duplicated content related to the first location information 630, the second location information 640, and the third location information 650, refer to the above description.

Unlike FIG. 4, when the courier enters a building, a signal related to at least one of the first location information, the second location information, and the third location information may change by more than a reference value. For example, when the courier enters the interior of a 20-story building, the strength of a signal related to at least one of the first location information, the second location information, and the third location information may decrease by more than a reference value. Specifically, when the strength of the signal communicated with the satellite decreases by more than a reference value, the electronic apparatus may determine that the courier has entered the building. For another example, when the courier enters the interior of a 20-story building, the number of signals related to at least one of the first location information, the second location information, and the third location information may decrease by more than a reference value. Specifically, when the number of signals communicated with the satellite for a certain period of time decreases by more than a reference value, the electronic apparatus may determine that the courier has entered the building.

The electronic apparatus may extract the third line 610 using the location information 630 excluding the location information determined that the courier has entered the building. That is, the electronic apparatus may extract the third line 610 using the first location information 630 before a signal related to at least one of the first location information, the second location information, and the third location information changes by more than a reference value. At this time, the location information before the signal related to at least one of the first location information, the second location information, and the third location information changes by more than a reference value may be information related to a location before the courier enters the building. For example, if it is determined that the courier has entered the building at 10:10:08, the electronic apparatus may extract the third line 610 using the location information 611 and 613 before the courier enters the building among the first location information 630. At this time, the location information 611 may be information related to the location of the courier terminal identified at 10:10:06 based on the first location information 630, and the location information 613 may be information related to the location of the courier terminal identified at 10:10:03 based on the first location information 630.

Also, the electronic apparatus may extract the fourth line 620 using the location information 640 and 650 excluding location information determined that the courier has entered the building. That is, the electronic apparatus may use the second location information 640 and the third location information 650 before a signal related to at least one of the first location information, the second location information, and the third location information changes by more than a reference value to extract the fourth line 620. At this time, the location information before the signal related to at least one of the first location information, the second location information, and the third location information changes by more than a reference value may be information related to a location before the courier enters the building. For example, when it is determined that the courier has entered the building at 10:10:08, the electronic apparatus may extract the fourth line 620 using the location information 621 before the courier enters the building among the second location information 640 and the location information 623 before the courier enters the building among the third location information 650. At this time, the location information 621 may be information related to the location of the courier terminal identified at 10:10:06 based on the second location information, and the location information 623 may be information related to the location of the courier terminal identified at 10:10:06 based on the third location information.

At this time, the third line 610 may be an extension line extending from the location information 613 toward the location information 611 by a predetermined length (e.g., 6 m). In addition, the fourth line 620 may be an extension line extending from the location information 623 toward the location information 621 by a predetermined length (e.g., 6 m). In this case, the extended length is optimized through an experiment, and may be varied according to the delivery environment.

If the delivery address of the item on the map is address B, since at least one of the third line 610 and the fourth line 620 matches the address B, the electronic apparatus may determine that the courier correctly delivered the item to the delivery address. Or, if the delivery address of the item on the map is address A other than the address B, neither the third line 610 nor the fourth line 620 matches the address A, and accordingly, the electronic apparatus may determine that the courier misdelivered the item.

According to an embodiment, since it is determined whether or not the courier has reached the delivery address using different location information, the accuracy in which the electronic apparatus detects misdelivery of an item may be improved.

Figure 7:
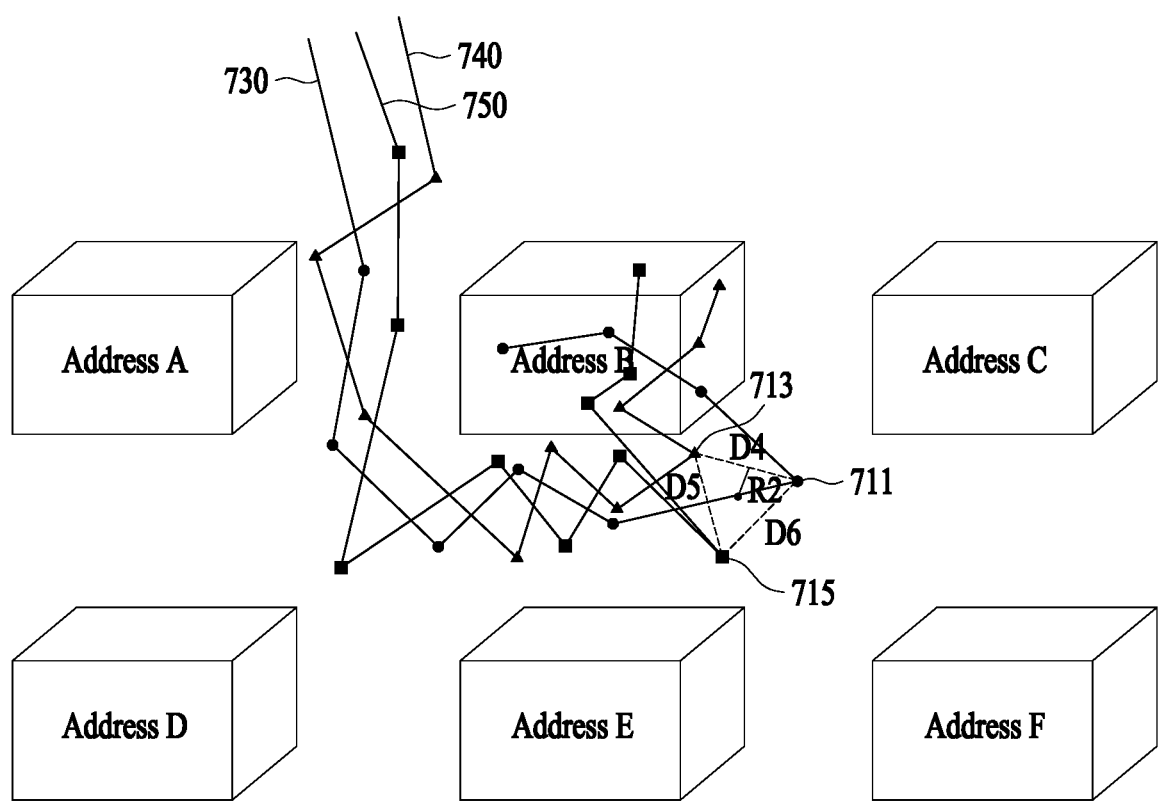
FIG. 7 illustrates an embodiment of extracting a second polygon using location information.

FIG. 7 illustrates an embodiment of extracting a second polygon using location information.

The courier may select the delivery completion button on the courier terminal, and the electronic apparatus may identify and connect the location information of the courier terminal for a specific time (e.g., 3 minutes) in the past from the moment when delivery completion information is obtained. For duplicated content related to the first location information 730, the second location information 740, and the third location information 750, refer to the above description.

Unlike FIG. 5, when the courier enters a building, a signal related to at least one of the first location information, the second location information, and the third location information may change by more than a reference value. For example, when the courier enters the interior of a 20-story building, the strength of a signal related to at least one of the first location information, the second location information, and the third location information may decrease by more than a reference value. Specifically, when the strength of the signal communicated with the satellite decreases by more than a reference value, the electronic apparatus may determine that the courier has entered the building. For another example, when the courier enters the interior of a 20-story building, the number of signals related to at least one of the first location information, the second location information, and the third location information may decrease by more than a reference value. Specifically, when the number of signals communicated with the satellite for a certain period of time decreases by more than a reference value, the electronic apparatus may determine that the courier has entered the building.

The electronic apparatus may extract the second polygon using the location information 711, 713, and 715 excluding the location information determined that the courier has entered the building. Specifically, the electronic apparatus may extract the second polygon using the location information before a signal related to at least one of the first location information, the second location information, and the third location information changes by more than a reference value. At this time, the location information before the signal related to at least one of the first location information, the second location information, and the third location information changes by more than a reference value may be information related to a location before the courier enters the building. For example, when it is determined that the courier has entered the building at 10:10:08, the electronic apparatus may extract the second polygon using the location information 711 before the courier enters the building among the first location information 730, the location information 713 before the courier enters the building among the second location information 740, and the location information 715 before the courier enters the building among the third location information 750. At this time, the location information 711 may be information related to the location of the courier terminal identified at 10:10:06 based on the first location information, the location information 713 may be information related to the location of the courier terminal identified at 10:10:06 based on the second location information, and the location information 715 may be information related to the location of the courier terminal identified at 10:10:06 based on the third location information.

The second polygon may be extracted when the location information 711, the location information 713, and the location information 715 correspond to a specific condition. Specifically, when i) the separation distances D4, D5, and D6 between the location information 711, the location information 713, and the location information 715 are less than a predetermined distance (e.g., 15 m), and ii) the midpoint 1 between the location information 711 and the location information 713, the midpoint 2 between the location information 713 and the location information 715, and the midpoint 3 between the location information 715 and the location information 711 are included in the inside of a circle with radius R2 (e.g., 4 m), the second polygon may be extracted. At this time, the predetermined distance and radius R2 are values optimized through an experiment and may vary according to the delivery environment.

For example, the separation distance D4 between the location information 711 and the location information 713 may be less than 15 m, the separation distance D5 between the location information 713 and the location information 715 may be less than 15 m, and the separation distance D6 between the location information 715 and the location information 711 may be less than 15 m. In addition, when the midpoint 1 between the location information 711 and the location information 713, the midpoint 2 between the location information 713 and the location information 715, and the midpoint 3 between the location information 715 and the location information 711 are included inside a circle with a radius R2 (e.g., 4 m), the second polygon may be extracted.

When the second polygon matches the delivery address, the electronic apparatus may determine that the courier accurately delivered the item to the delivery address. However, if the second polygon does not match the delivery address, the electronic apparatus may determine that the courier misdelivered the item.

Figure 8:
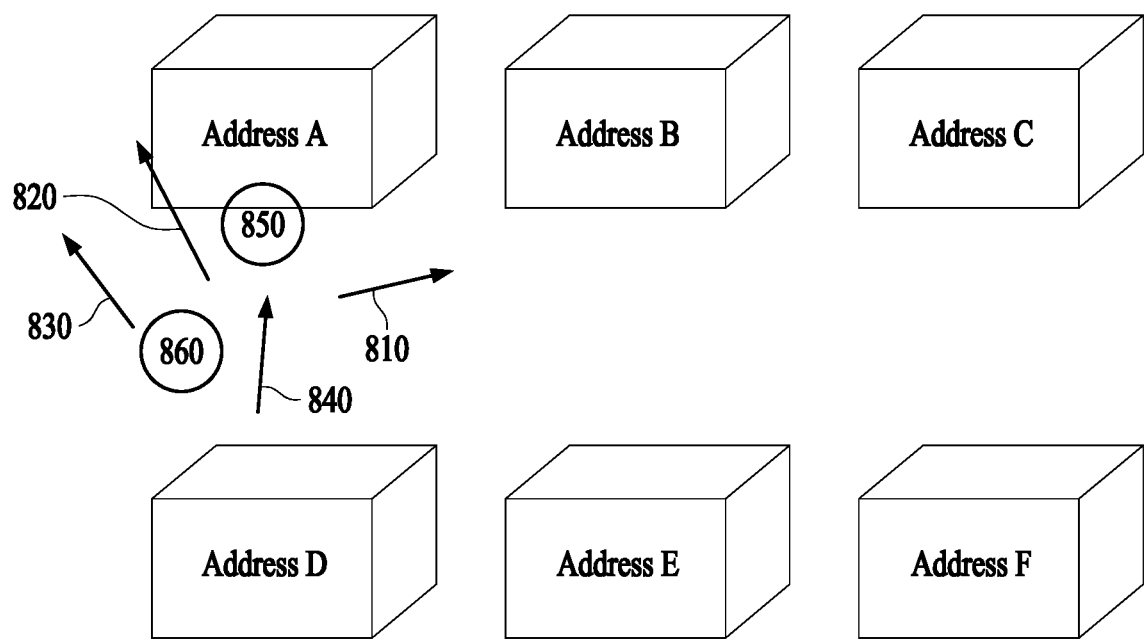
FIGS. 8 to 10 illustrate an embodiment in which an electronic apparatus detects misdelivery.
Figure 9:
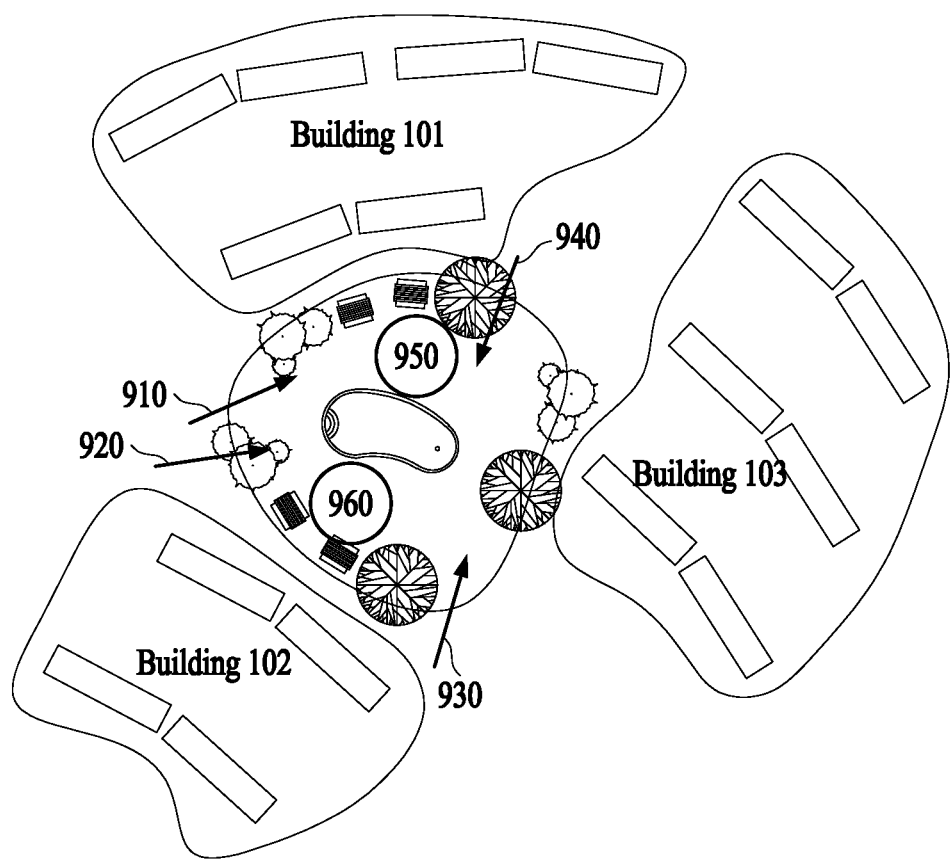
Figure 10:
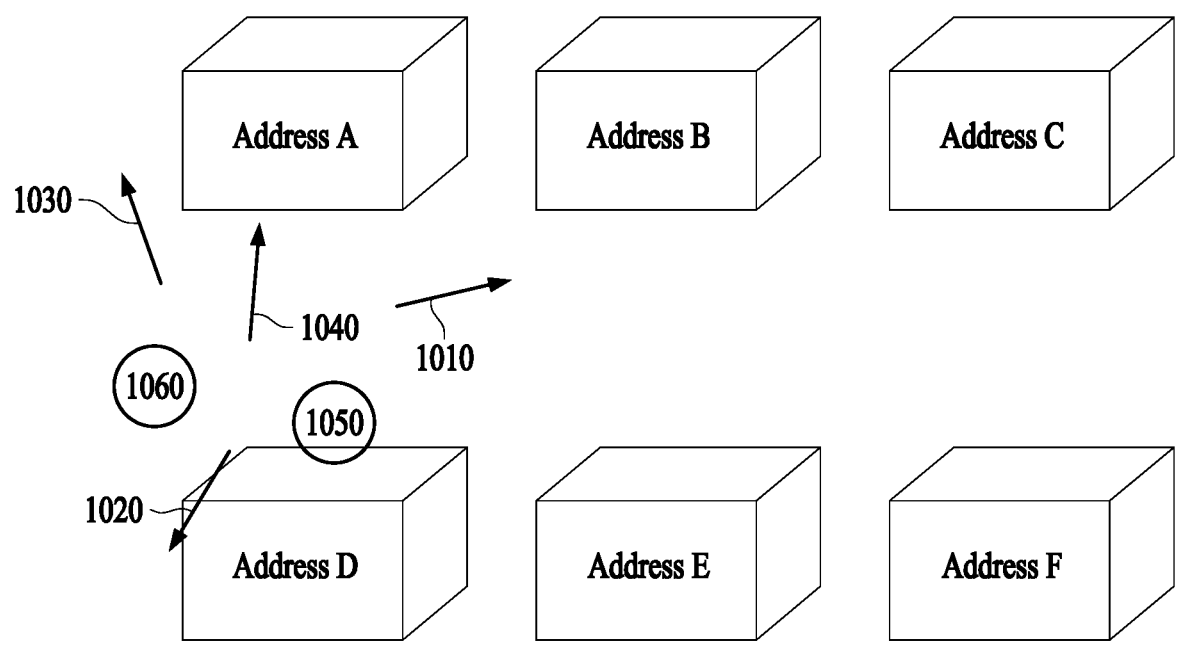

FIGS. 8 to 10 illustrate an embodiment in which an electronic apparatus detects misdelivery.

For a specific process in which the electronic apparatus extracts at least one of the first line 810, 910, or 1010, the second line 820, 920, or 1020, the third line 830, 930, or 1030, the fourth line 840, 940, or 1040, the first polygon 850, 950, or 1050, and the second polygon 860, 960, or 1060 based on the location information, refer to the above description.

The courier can deliver an item to address A on the map. At this time, the electronic apparatus may monitor the location of the courier terminal, and extract at least one of the first line 810, 910, or 1010, the second line 820, 920, or 1020, the third line 830, 930, or 1030, the fourth line 840, 940, or 1040, the first polygon 850, 950, or 1050, and the second polygon 860, 960, or 1060 at the moment when delivery completion information is obtained from the courier terminal. The electronic apparatus can extract six pieces of information (the first line, the second line, the third line, the fourth line, the first polygon, and the second polygon) from the location information, and when using the six pieces of information, the reliability and accuracy of misdelivery can be improved.

At this time, if at least one of the first line 810, 910, or 1010, the second line 820, 920, or 1020, the third line 830, 930, or 1030, the fourth line 840, 940, or 1040, the first polygon 850, 950, or 1050, and the second polygon 860, 960, or 1060 matches the address A that is the delivery address, the electronic apparatus may determine that the courier has delivered the item to the correct address. Referring to FIG. 8, since the second line 820 and the first polygon 850 extracted from the location of the courier terminal match the address A that is the delivery address, the electronic apparatus can determine that the courier has delivered the item to the correct address.

Alternatively, if at least one of the first line 810, 910, or 1010, the second line 820, 920, or 1020, the third line 830, 930, or 1030, the fourth line 840, 940, or 1040, the first polygon 850, 950, or 1050, and the second polygon 860, 960, or 1060 does not match the delivery address or another address, the electronic apparatus may determine that the location information of the courier terminal is not reliable. FIG. 9 shows an embodiment in which all of the first line 910, the second line 920, the third line 930, the fourth line 940, the first polygon 950, and the second polygon 960 extracted from the location of the courier terminal do not match Building 102, which is the delivery address. Rather, the first line 910, the second line 920, the third line 930, the fourth line 940, the first polygon 950 and the second polygon 960 extracted based on the location information of the courier terminal match a garden formed in an apartment complex other than the delivery address of Building 102, and the electronic apparatus may determine that the location information of the courier terminal is not reliable. The garden in the apartment complex may be an example in which the address is not identified. In this case, the electronic apparatus may not transmit an alarm message related to misdelivery to the courier terminal.

Alternatively, if at least one of the first line 810, 910, or 1010, the second line 820, 920, or 1020, the third line 830, 930, or 1030, the fourth line 840, 940, or 1040, the first polygon 850, 950, or 1050, and the second polygon 860, 960, or 1060 matches address D other than the delivery address A, the electronic apparatus may determine that the courier has misdelivered the item. Referring to FIG. 10, since the second line 1020 and the first polygon 1050 extracted from the location of the courier terminal match address D other than the delivery address A, the electronic apparatus may detect that the courier has misdelivered the item.

Figure 11:
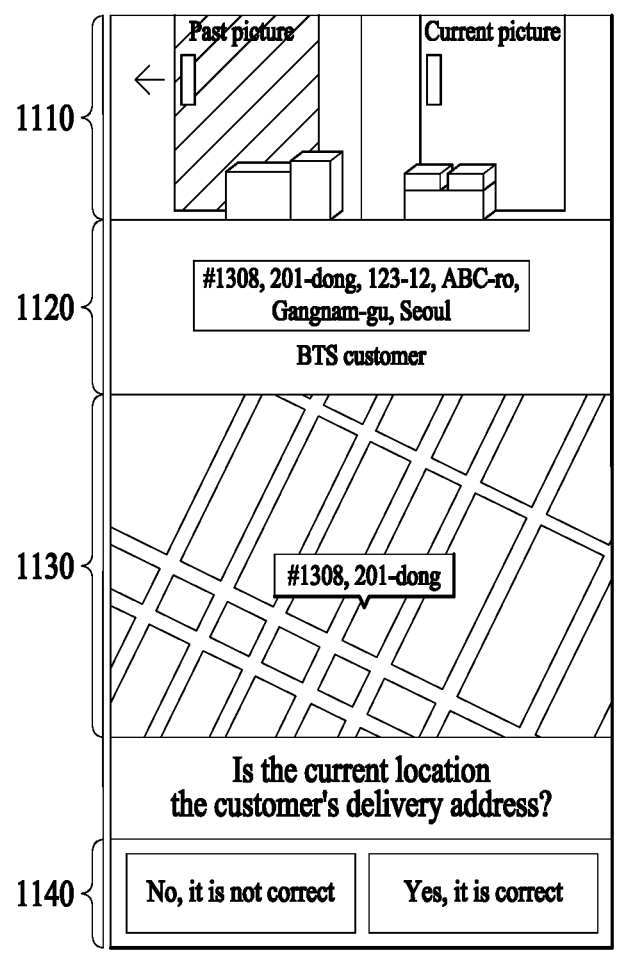
FIG. 11 illustrates an embodiment related to an alarm message displayed on a courier terminal.

FIG. 11 illustrates an embodiment related to an alarm message displayed on a courier terminal.

Upon detecting that a courier misdelivered an item, the electronic apparatus may transmit an alarm message to the courier terminal, and the courier may check the alarm message through the courier terminal. At this time, the alarm message may include at least one of past delivery completion information, current delivery completion information, and information related to delivery of the item.

Specifically, the alarm message may include a picture of past delivery completion and a picture of current delivery completion in area 1110. The courier can check whether the delivery is incorrect using the picture of past delivery completion and the picture of current delivery completion. In addition, the alarm message may include information on or regarding the delivery address and purchaser of the item in area 1120, and information on or regarding which the delivery address is displayed on the map in area 1130. Accordingly, the courier can check whether the item is misdelivered. In addition, the alarm message may include a button in area 1140 for the courier to select misdelivery or not. Therefore, if the courier misdelivered the item, "No, it is not correct" button can be selected, or if the courier delivered the item correctly, "Yes, it is correct" button can be selected.

Figure 12:
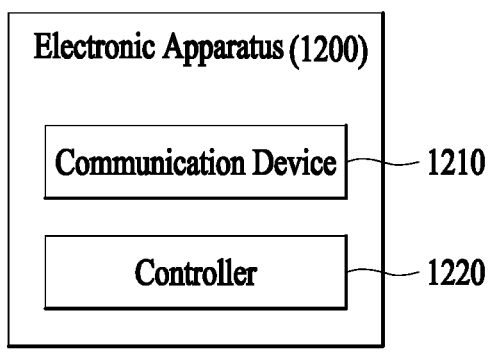
FIG. 12 is a block diagram of an electronic apparatus according to an embodiment.

FIG. 12 is a block diagram of an electronic apparatus according to an embodiment.

According to an embodiment, the electronic apparatus 1200 may include a communication device 1210 and a controller 1220. In the electronic apparatus 1200 illustrated in FIG. 12, only components related to the present embodiment are shown. Accordingly, it can be understood by those of ordinary skill in the art related to the present embodiment that other general-purpose components may be further included in addition to the components shown in FIG. 12. Since the electronic apparatus 1200 may include features related to the electronic apparatus describe above, descriptions of duplicated contents will be omitted.

The communication device 1210 is a device for performing wired/wireless communication and may communicate with an external electronic apparatus. The external electronic apparatus may be a terminal or a server. In addition, communication technologies used by the communication device 1210 include Global System for Mobile communication (GSM), Code Division Multi Access (CDMA), Long Term Evolution (LTE), 5G, Wireless LAN (WLAN), Wireless-Fidelity (Wi-Fi), Bluetooth™, Radio Frequency Identification (RFID), Infrared Data Association (IrDA), ZigBee, Near Field Communication (NFC), and the like.

The controller 1220 may control the overall operations of the electronic apparatus 1200 and may process data and signals. The controller 1220 may be configured with at least one hardware unit. Also, the controller 1220 may operate by one or more software modules generated by executing program codes stored in the memory. The controller 1220 may include a processor and a memory, and the processor may control overall operations of the electronic apparatus 1200 and process data and signals by executing program codes stored in the memory.

The controller 1220 may monitor the location of the courier terminal, and detect misdelivery of the item by the courier based on the delivery address and the location of the courier terminal. Specifically, the controller 1220 may monitor the location of the courier terminal in real time using at least one of the first location information, the second location information, and the third location information, and detect misdelivery of the item based on whether the location of the courier terminal matches the delivery address or not. At this time, when it is determined that the item has been misdelivered, the controller may transmit an alarm message to the courier terminal. The alarm message may include at least one of past delivery completion information, current delivery completion information, and information related to delivery of the item.

Figure 13:
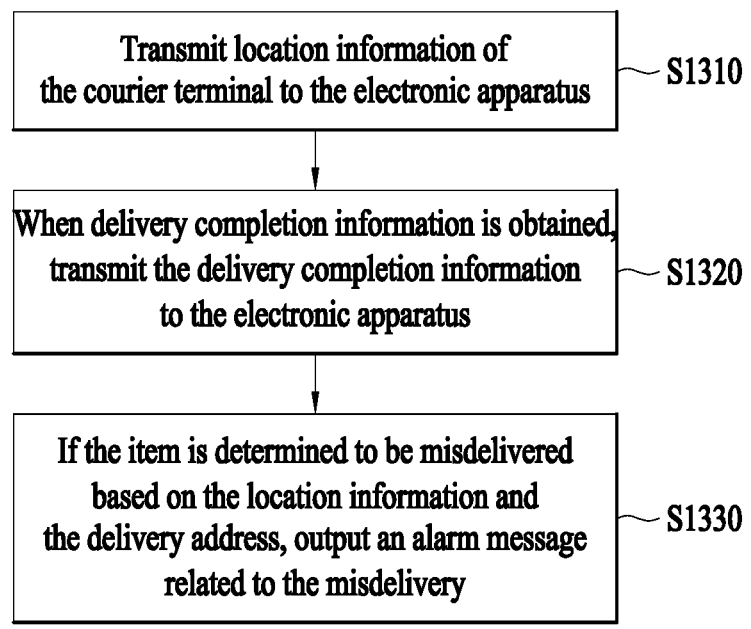
FIG. 13 illustrates an embodiment of a method of operating a courier terminal.

FIG. 13 illustrates an embodiment of a method of operating a courier terminal.

Description of the contents duplicated with the above-described contents related to the courier terminal and the electronic apparatus will be omitted.

In operation S1310, the courier terminal may transmit location information to the electronic apparatus.

In operation S1320, when the courier terminal receives delivery completion information from the courier, the delivery completion information may be transmitted to the electronic apparatus. When the courier completes delivery of the item to the delivery address, the courier may select a delivery completion button on the courier terminal, and the courier terminal may transmit delivery completion information to the electronic apparatus.

In operation S1330, if the delivery of the item is determined to be misdelivery based on the location information and the delivery address, the courier terminal may output an alarm message related to the misdelivery. If the electronic apparatus determines misdelivery based on the location of the courier terminal and the delivery address, the electronic apparatus may transmit the alarm message to the courier terminal, and the courier terminal may output the alarm message. At this time, the alarm message may include at least one of past delivery completion information, current delivery completion information, and information related to delivery of the item.

The electronic apparatus or terminal according to the above-described embodiments may include a permanent storage such as a disk drive, a communication port for handling communications with external devices, and user interface devices such as a touch panel, a key, and a button. The methods that are implemented as software modules or algorithms may be stored as program instructions or computer-readable codes executable by the processor on a computer-readable recording medium. Here, examples of the computer-readable recording medium include magnetic storage media (e.g., read only memory (ROM), random access memory (RAM), floppy disk, or hard disk), optically readable media (e.g., compact disk-read only memory (CD-ROM) or digital versatile disk (DVD)), etc. The computer-readable recording medium may be distributed over network coupled computer systems, and thus, the computer-readable code may be stored and executed in a distributed fashion. This medium may be read by the computer, stored in the memory, and executed by the processor.

The present embodiments may be described in terms of functional block components and various processing steps. Such functional blocks may be realized by any number of hardware and/or software components configured to perform specified functions. For example, embodiments may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the present embodiments may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the embodiments described herein could employ any number of conventional techniques for electronics configuration, signal processing and/or control, data processing and the like. The terms "mechanism," "element," "means," and "configuration" are used broadly and are not limited to mechanical or physical embodiments. Those terms may include software routines in conjunction with processors, etc.

The above-described embodiments are only examples, and other embodiments may be implemented within the scope of the following claims.

What is claimed is:

1. An operating method of an electronic apparatus for detecting misdelivery of an item by a courier, the method comprising:
    monitoring a courier terminal using at least one of a first location information type, a second location information type, or a third location information type at a plurality of respective points in time, the courier terminal and the electronic apparatus being configured to communicate with each other over a data communications network;
    acquiring a plurality of points comprising at least a first point and a second point on a map associated with the courier terminal based on at least one of the first location information type, the second location information type, or the third location information type, wherein the first point is indicative of a position of the courier terminal detected at a first time that is earlier than a time associated with an attempted delivery, wherein the second point is indicative of a position of the courier terminal detected at a second time that is earlier than the first time;
    generating a first trajectory line and a second trajectory line based on connecting the first point and the second point with a straight line and extending, by a prescribed length, the straight line from the first point in a direction opposite to the second point,
    wherein the first trajectory line is generated based on the first location information type monitored at the first time and the second time, and wherein the second trajectory line is generated based on the second information type monitored at the first time and the third location information type monitored at the first time;
    displaying the map on a display of the electronic apparatus, the displayed map comprising the first point, the second point, the first trajectory line, and the second trajectory line;
    obtaining, from the courier terminal via data communication over the network, data indicative of completion of the attempted delivery; and
    in response to the obtained data indicative of the completion of the attempted delivery, detecting misdelivery of the item by the courier based on determining the first trajectory line and the second trajectory line do not overlap with a defined area on the map associated with the delivery address.

2. The operating method of claim 1, wherein the monitoring further comprises:
    acquiring data relating to a plurality of signal strength level values associated with the courier terminal at the plurality of respective points in time; and
    detecting, based on the acquired data relating to the signal strength level values, a change in a signal strength level from the courier terminal, the signal strength level related to at least one of the first location information type, the second location information type, or the third location information type; and
    wherein detecting the misdelivery further comprises, in response to the detected change being greater than a reference value, detecting the misdelivery of the item by determining that the first trajectory line and the second trajectory line do not overlap with the defined area on the map associated with the delivery address, wherein the first time and the second time are each earlier than a time associated with the detected change in the signal strength level.

3. The operating method of claim 1, wherein the monitoring further comprises:
    generating a polygon on the map based on the first point, a third point, and a fourth point, wherein the third point and the fourth point are each (i) based on at least one of the first location information type, the second location information type, or the third location information type, and (ii) indicative of a position of the courier terminal prior to the attempted delivery; and
    wherein detecting the misdelivery comprises determining that the polygon does not overlap with the defined area associated with the delivery address.

4. The operating method of claim 3, wherein the monitoring further comprises:
    detecting a change in a signal strength level from the courier terminal, the signal strength level being related to at least one of the first location information type, the second location information type, or the third location information type, wherein detecting the misdelivery further comprises, in response to the detected change being greater than a reference value, detecting the misdelivery of the item by determining that the polygon does not overlap with the defined area associated with the delivery address.

5. The operating method of claim 3, wherein detecting the misdelivery comprises:
   detecting the misdelivery of the item only when:
   a first distance between the first point and the third point, a second distance between the third point and the fourth point, and the third distance between the fourth point and the first point are each less than a predetermined distance, or
   a first midpoint between the first point and the third point, a second midpoint between the third point and the fourth point, and the third midpoint between the fourth point and the first point are each within a predetermined distance from a center point of the generated polygon.

6. The operating method of claim 1, further comprising:
   transmitting data indicative of an alarm message to the courier terminal when the misdelivery is detected.

7. The operating method of claim 6, wherein the alarm message is related to at least one of: a past delivery completion or the completion of the attempted delivery.

8. The operating method of claim 1, wherein:
   the first location information type comprises location information of the courier terminal determined based on communication with a satellite;
   the second location information type comprises location information of the courier terminal determined based on communication with a base station, and
   the third location information type comprises location information of the courier terminal based on (i) the communication with the satellite or the base station and (ii) a correction applied based on at least one of the first location information and the second location information.

9. The operating method of claim 1, wherein detecting the misdelivery comprises:
   detecting the misdelivery only when a time difference between a time associated with at least one of the acquired points and the time associated with the attempted delivery is less than a predetermined value.

10. The operating method of claim 1, wherein detecting the misdelivery comprises:
    detecting the misdelivery only when a number of the acquired points is equal to or higher than a predetermined number.

11. The operating method of claim 1, wherein detecting the misdelivery comprises:
    detecting the misdelivery only when each of the points acquired at a prescribed time, respectively, based on the first location information type, the second location information type, and the third location information type is within a predetermined distance from one another.

12. A method operable by a courier terminal for detecting misdelivery of an item by a courier, the method comprising:
    transmitting, at a plurality of points in time, data indicative of a location of the courier terminal to an electronic apparatus, the courier terminal and the electronic apparatus being configured to communicate with each other over a data communications network;
    receiving an input on a device user interface (UI) of the courier terminal, the input indicative of an attempted delivery of the item;
    transmitting data relating to the attempted delivery of the item to the electronic apparatus;
    receiving, from the electronic apparatus, data indicative of misdelivery of the item; and
    displaying an alarm message related to the misdelivery on the device UI;
    wherein the communication between the courier terminal and the electronic apparatus facilitates:
    monitoring the courier terminal using at least one of a first location information type, a second location information type, or a third location information type at a plurality of respective points in time;
    acquiring a plurality of points comprising at least a first point and a second point on a map associated with the courier terminal based on at least one of the first location information type, the second location information type, or the third location information type, wherein the first point is indicative of a position of the courier terminal detected at a first time that is earlier than a time associated with an attempted delivery, wherein the second point is indicative of a position of the courier terminal detected at a second time that is earlier than the first time;
    generating a first trajectory line and a second trajectory line based on connecting the first point and the second point with a straight line and extending, by a prescribed length, the straight line from the first point in a direction opposite to the second point,
    wherein the first trajectory line is generated based on the first location information type monitored at the first time and the second time, and wherein the second trajectory line is generated based on the second information type monitored at the first time and the third location information type monitored at the first time; and
    in response to data indicative of completion of the attempted delivery, detecting misdelivery of the item by the courier based on a determination that the first trajectory line and the second trajectory line do not overlap with a defined area on the map associated with the delivery address.

13. An electronic apparatus for detecting misdelivery of an item by a courier, the electronic apparatus comprising:
    a communications device configured for communication over a data communications network with a courier terminal; and
    a controller configured to:
    monitor the courier terminal using at least one of a first location information type, a second location information type, or a third location information type at a plurality of respective points in time;
    acquire a plurality of points comprising at least a first point and a second point on a map associated with the courier terminal based on at least one of the first location information type, the second location information type, or the third location information type, wherein the first point is indicative of a position of the courier terminal detected at a first time that is earlier than a time associated with an attempted delivery, wherein the second point is indicative of a position of the courier terminal detected at a second time that is earlier than the first time;
    generate a first trajectory line and a second trajectory line based on connecting the first point and the second point with a straight line and extending, by a prescribed length, the straight line from the first point in a direction opposite to the second point, wherein the first trajectory line is generated based on the first location information type monitored at the first time and the second time, and wherein the second trajectory line is generated based on the second information type monitored at the first time and the third location information type monitored at the first time;

display the map on a display of the electronic apparatus, the displayed map comprising the first point, the second point, the first trajectory line, and the second trajectory line;

obtain, from the courier terminal via data communication over the network, data indicative of completion of the attempted delivery; and in response to the obtained data indicative of the completion of the attempted delivery, detect misdelivery of the item by the courier based on a determination that the first trajectory line and the second trajectory line do not overlap with a defined area on the map associated with the delivery address.

\* \* \* \* \*